United States Patent
Yavin

(10) Patent No.: US 9,063,391 B2
(45) Date of Patent: Jun. 23, 2015

(54) METHOD AND SYSTEM FOR INCREASING THE SIZE OF THE AREA SCANNED BY AN AIRBORNE ELECTRO-OPTIC RECONNAISSANCE SYSTEM IN A GIVEN TIME

(75) Inventor: Zvi Yavin, Gilon-Misgav (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 13/813,809

(22) PCT Filed: Aug. 11, 2011

(86) PCT No.: PCT/IL2011/000654
§ 371 (c)(1),
(2), (4) Date: Feb. 1, 2013

(87) PCT Pub. No.: WO2012/020413
PCT Pub. Date: Feb. 16, 2012

(65) Prior Publication Data
US 2013/0142500 A1  Jun. 6, 2013

(30) Foreign Application Priority Data

Aug. 12, 2010  (IL) .......................................... 207590

(51) Int. Cl.
*G03B 15/00* (2006.01)
*G01C 11/02* (2006.01)
*H04N 3/08* (2006.01)

(52) U.S. Cl.
CPC ............... *G03B 15/00* (2013.01); *G01C 11/025* (2013.01); *H04N 3/08* (2013.01)

(58) Field of Classification Search
CPC ......... G03B 15/00; H04N 3/08; G01C 11/025
USPC .............. 396/7; 348/117, 135, 139, 142, 143, 348/144; 701/3, 6, 10, 208, 211; 340/995.24, 995.27; 342/25 B, 354; 244/165
See application file for complete search history.

(56) References Cited

U.S. PATENT DOCUMENTS 5,155,597 A  10/1992  Lareau
5,668,593 A  9/1997  Lareau
(Continued)

FOREIGN PATENT DOCUMENTS

| EP | 1517158 | 3/2005 |
|---|---|---|
| WO | WO-97/42659 | 11/1997 |
| WO | WO-2007/004212 | 1/2007 |
| WO | WO-2008/075335 | 6/2008 |

OTHER PUBLICATIONS

International Search Report Dated Dec. 28, 2011 with written opinion.

*Primary Examiner* — Rochelle-Ann J Blackman
(74) *Attorney, Agent, or Firm* — Venable LLP; Robert Kinberg

(57) ABSTRACT

The invention relates to an airborne reconnaissance system which comprises: (a) optical unit for acquiring light rays from a terrain portion, said optical unit comprises a plurality of optical components that are positioned along an optical path and designed to maneuver said light rays to produce at a focal plane an acquired image of a terrain portion, said acquired image having an area S which is several times larger than the area A of a focal plane array which is positioned at same focal plane; (b) gimbals unit for performing a continuous back and forth across-track scanning movement of a respective line of sight formed between said optical unit and the terrain below the aircraft; (c) a first back-scanning mirror along said optical path, for compensating for said continuous across track movement of the line of sight, said compensation is performed during a respective integration period for a section of said acquired image of area S which falls during said period on said focal plane array; and (d) a second, along-track mirror also positioned along said optical path, which alternates between plurality of along track states, each state causes a different diversion of the light rays within said optical path thereby to impinge on said focal plane array another along-track section of said acquired image of area S; and (e) capturing means for recording in each state of said along-track mirror the corresponding section of the terrain image which is impinged during said state on the focal plane array.

6 Claims, 8 Drawing Sheets

(56) References Cited

U.S. PATENT DOCUMENTS

| | | |
|---|---|---|
| 5,672,866 A | 9/1997 | Messina |
| 5,692,062 A | 11/1997 | Lareau |
| 6,130,705 A | 10/2000 | Lareau |
| 6,256,057 B1 | 7/2001 | Mathews |
| 7,474,332 B2 * | 1/2009 | Byren .......................... 348/169 |
| 2007/0129853 A1 | 6/2007 | Greenfeld et al. |
| 2009/0009602 A1 * | 1/2009 | Yavin et al. .................. 348/144 |
| 2012/0292482 A1 * | 11/2012 | Cook et al. ................. 250/206.1 |

* cited by examiner

METHOD AND SYSTEM FOR INCREASING THE SIZE OF THE AREA SCANNED BY AN AIRBORNE ELECTRO-OPTIC RECONNAISSANCE SYSTEM IN A GIVEN TIME

FIELD OF THE INVENTION

The field of the invention relates in general to airborne reconnaissance systems. More particularly, the present invention relates to method and system for size of the area scanned by an airborne electro-optic reconnaissance system in a given time.

BACKGROUND OF THE INVENTION

Airborne reconnaissance systems have been widely used for many years now, particularly for obtaining images from the air of areas of interest.

Originally, a film camera was used on board aircraft for capturing the images. The main drawback of the film-camera based reconnaissance system is the long duration required for developing the film, an operation that can be performed only after landing. This problem has been overcome in more modern systems by the use of a one-dimensional vector or a two-dimensional array of light-sensitive sensors (generally called "Focal Plane Array"—FPA) in the camera for obtaining electronic images that are then electronically stored within the aircraft, and/or transmitted to a ground base station.

Airborne reconnaissance systems are generally used to obtain images of hostile areas, and therefore the task of obtaining such images involves some particular requirements, such as:

1. Flying the aircraft at high elevation and speed in order to reduce the risk of being targeted by enemy weapons, and in order to widen the area captured by each image;
2. Capturing as much as possible of relevant image information during as short as possible flight;
3. Operating under various visibility conditions, while not compromising the resolution of the images and their quality.
4. Photographing of rough terrains (e.g., high mountains, areas having sharp ground variations), in high resolution and image quality.

The need for securing the reconnaissance aircraft, while flying above or close to hostile areas has significantly increased the flying costs and risks, as sometimes the reconnaissance mission requires escorting of the aircraft by other, fighter aircrafts. Therefore, the need for enabling a short and reliable mission, while at the same time capturing as many as possible reconnaissance images of the terrain during the flight is of a very high importance.

There are several other problems involved in carrying out airborne reconnaissance. For example, the capturing of images from a fast-moving aircraft introduces the need for a so-called Forward Motion Compensation (Hereinafter, the term "Forward Motion Compensation" will be shortly referred to as FMC. Motion Compensation in general will be referred to as MC), which compensates for the aircraft movement during the opening of the camera shutter (whether mechanical or electronic; in the latter case, the opening of the camera "shutter" for the purpose of exposure is essentially the integration of light photons at the focal plane array).

The following are three examples for airborne reconnaissance systems that are typically used:

(i) The Along-Track Scanning (also known as "push-broom scanning")—In a first configuration of the Along-Track Scanning, the light-sensitive sensors are arranged in a one-dimensional vector (row), perpendicular to the flight direction. The scanning of the imaged area is obtained by the progression of the aircraft. In one specific configuration of Along-Track Scanning, generally called Along-Track TDI (Time Delayed Integration) configuration, a plurality of such parallel one-dimensional vectors (pixel-rows) perpendicular to the flight direction are provided at the front of the camera forming a two-dimensional array. In that case, however, the first row of the array captures an area section, while all the subsequent rows are used to capture the same section, but at a delay dominated by the aircraft progression. Then, for each row of pixels, a plurality of corresponding pixels of all the rows in the array, as separately measured, are first added, and then averaged in order to determine the pixel measured light intensity value. More particularly, each pixel in the image is measured N times (N being the number of rows) and then averaged. This Along-Track TDI configuration is found to improve the signal-to-noise ratio, and to improve the image quality and the reliability of measuring.

(ii) The Across-Track Scanning (also known as "Whisk-broom Scanning")—In the Across-Track Scanning, a one-dimensional sensing vector of light-sensitive sensors, arranged parallel to the flight direction, is used. The sensing vector is positioned on gimbals having one degree of freedom, which, during the flight, repeatedly moves the whole vector right and left in a direction perpendicular to the direction of flight, while always keeping the vector in an orientation parallel to the direction of flight. Another Across-Track Scanning configuration uses a moving mirror or prism to sweep the line of sight (hereinafter, LOS) of a fixed vector of sensors across-track, instead of moving the vector itself. In such a case, the Across-Track Scanning of the area by the gimbal having one degree of freedom, while maintaining the forward movement of the aircraft, widens the captured area. Another configuration of the Across-Track Scanning is the Across-Track TDI configuration. In this configuration there exists a plurality of vectors (columns) in a direction parallel to the flight direction, forming a two-dimensional array. This Across-Track TDI, in similarity to the Along-Track Scanning TDI, provides an improved reliability in the measuring of pixel values, more particularly, an improvement in the signal-to-noise ratio.

(iii) Digital Framing Scanning—In Digital Framing Scanning, a two-dimensional array of light-sensitive sensors is positioned with respect to the scenery. In U.S. Pat. No. 5,155,597 and U.S. Pat. No. 6,256,057 the array is positioned such that its column-vectors (a column being a group of the array's columns) are parallel to the flight direction. Forward motion compensation (FMC) is provided electronically on-chip (in the detector focal plane array) by the transferring of charge from a pixel to the next adjacent pixel in the direction of flight during the sensor's exposure time (also called "integration time"). The charge transfer rate is determined separately for each column (or for the whole array as in U.S. Pat. No. 6,256,057 where a slit is moved in parallel to the columns direction), depending on its individual distance (range) from the captured scenery, assuming flat ground. In WO 97/42659 this concept is extended to handle transferring of charge separately for each cell instead of column, a cell being a rectangular group of pixels. In the system of U.S. Pat. No. 5,692,062, digital image correlation between successive frames captured by each column is performed, in order to measure the velocity of the scenery with respect to the array, and the correlation result is used for estimating the average range of each column to the scenery, for the purpose of motion compensation in terrain with large variations. This compensation method requires capturing of three successive frames for each single image, two for the correlation process and one for the final motion-compensated frame. The system of U.S. Pat. No. 5,668,593 uses a 3-axis sightline stepping mechanism for expanding coverage of the area of interest, and it applies a motion compensation technique by means of transferring of charge along columns. U.S. Pat. No. 6,130,705 uses a zoom lens that automatically varies the camera field of view based on passive range measurements obtained from digital image correlation as described above. The field of view is tuned in accordance with prior mission requirements for coverage and resolution.

The present invention particularly relates to an across track scanning. Typically, in such a system the focal plane array is positioned on gimbal that scans the area of interest below the aircraft from the right horizon to the left horizon and back, while periodically capturing images. Typically, there are two types of mechanisms for compensating for the aircraft movement, as follows:

a. a typical step and stare system in which the gimbals system fixes the line of sight between the focal plane array and the relevant area portion, while any aircraft movement during the integration period is compensated mechanically by the gimbals adjustment such that the line of sight remains fixed. A drawback of the step and stare system is that the gimbals progresses in a non-continuous manner, i.e., it involves a frame capturing period (integration time) during which the gimbals stops its along-track movement, followed by acceleration to a next area portion, and a next frame capturing period during which the gimbals is stationary, and so on. The discontinuity of the gimbals progression, and particularly the periods in which the gimbals is stationary (during the integration period) significantly reduces the size of the area which can be scanned by an airborne reconnaissance system in a given time.

b. A back-scanning step and stare system in which the gimbals system continuously progresses the direction of the line of sight from the left horizon to the right horizon, while this gimbals movement during the integration period is compensated by a back-scanning mirror. Specifically, the back-scanning mirror is activated during the integration period and it moves in a direction opposite to the gimbals left-right progression in such a manner that the line of sight between the focal plane array and the area of interest remains fixed. The motion compensation for the aircraft progression may be obtained in various ways, either electronically, by the same back-scanning mirror, by enabling it to have two degrees of freedom (i.e., by also providing to it movement opposite to the aircraft direction). Optionally, the along track and across track compensations may be obtained by use of two separate back scanning mirrors. This use of back scanning mirrors enables a slightly higher size of the area which can be scanned by an airborne reconnaissance system in a given time, as the across track gimbals motion from the left to the right is essentially continuous without mechanical stops during the integration periods. However, although the speed of scanning is relatively continuous a part of the cycle period between the left horizon to the right horizon, the gimbals still have to decelerate before reaching the right and left ends of the cycle respectively, up to a full stop, which follows by changing the direction of the gimbals movement from left to right, and vice versa. During this deceleration periods the size of the area which can be scanned in a given time is significantly reduced.

As will be elaborated hereinafter, there are several factors that limit the size of the area which can be scanned by an airborne reconnaissance system in a given time, among them: (a) The row width D (in the direction of flight), i.e., the width (in the direction of flight) of the captured area portion and the altitude (above the terrain) of the aircraft, or in fact the "spanning angle" of the gimbals from the far left to the far right states; (b) The velocity V of the aircraft; (c) The maximal frame rate (i.e., the number of frames per second that can be captured, this parameter is, among others, limited by the integration period); and (d) The acceleration and deceleration periods of the gimbals system when it approaches the right and left ends.

WO 2007/004212 entitled "Method for reducing the number of scanning steps in an airborne reconnaissance system, and a reconnaissance system operating according said method" by same applicant discloses a system in which at each scanning step an image of a terrain portion which is several times larger than the size of the focal plane array is provided at the focal plane. A mirror somewhere at the optical path causes each time another section of said image to be impinged on the focal plane array. In such a manner, the number of scanning steps is reduced, as during one step plurality of frames can be obtained. However, the method and system of WO 2007/004212 still involves many stops of the gimbals, one stop for each scanning step, resulting in reduction of the size of the area which can be scanned in a given time.

It is therefore an object of the present invention to increase the size of the area which can be scanned by an airborne reconnaissance system in a given time.

It is a more specific object of the present invention to increase and maximize the size of the area which is scanned in a given time, by an across track airborne reconnaissance system.

It is another object of the present invention to obtain the above objects in a reliable and efficient manner.

Other objects and advantages of the invention will become apparent as the description proceeds.

SUMMARY OF THE INVENTION

The invention relates to an airborne reconnaissance system which comprises:
(a) optical unit for acquiring light rays from a terrain portion, said optical unit comprises a plurality of optical components that are positioned along an optical path and designed to maneuver said light rays to produce at a focal plane an acquired image of a terrain portion, said acquired image having an area S which is several times larger than the area A of a focal plane array which is positioned at same focal plane;
(b) gimbals unit for performing a continuous back and forth across-track scanning movement of a respective line of sight formed between said optical unit and the terrain below the aircraft; (c) a first back-scanning mirror along said optical path, for compensating for said continuous across track movement of the line of sight, said compensation is performed during a respective integration period for a section of said acquired image of area S which falls during said period on said focal plane array; and (d) a second, along-track mirror also positioned along said optical path, which alternates between plurality of along track states, each state causes a different diversion of the light rays within said optical path thereby to impinge on said focal plane array another along-track section of said acquired image of area 5; and (e) capturing means for recording in each state of said along-track mirror the corresponding section of the terrain image which is impinged during said state on the focal plane array.

Preferably, each of said first and second mirrors causes a change of diversion of the light rays due a rotation about one respective axis of said mirror, wherein each mirror rotation is independent and orthogonal to the rotation of the another mirror.

Preferably, the optical unit comprises a plurality of lenses and at least two motorized mirrors.

The invention also relates to a method for airborne reconnaissance, which comprises:
(a) providing an optical unit for acquiring light rays from a terrain portion, said optical unit comprises a plurality of optical components that are positioned along an optical path and designed to maneuver said light rays to produce at a focal plane an acquired image of a terrain portion, said acquired image having an area S which is several times larger than the area A of a focal plane array which is positioned at same focal plane; (b) providing a gimbals unit, and causing said gimbals unit to continuously across-track move back and forth a line of sight formed between said optical unit and the terrain below the aircraft; (c) providing a first, back-scanning mirror along said optical path, for compensating for said continuous across track movement of the line of sight, said compensation is performed during a respective integration period for a section of said acquired image of area S which falls during said period on said focal plane array; (d) providing a second, along-track mirror which is also positioned along said optical path, and causing it to alternate between plurality of along track states, each state causes a different diversion of the light rays within said optical path thereby to impinge on said focal plane array another along-track section of said acquired image of area 5; and (e) capturing and recording in each state of said along-track mirror the corresponding section of the terrain image which is impinged during said state on the focal plane array.

Preferably, each of said first and second mirrors causes a change of diversion of the light rays due a rotation about one respective axis of said mirror, and wherein each mirror rotation is independent from the rotation of the another mirror.

Preferably, the optical unit comprises a plurality of lenses and at least two motorized mirrors.

BRIEF DESCRIPTION OF THE DRAWINGS

In the drawings:

FIG. 7b shows the front view of the scanning process of FIG. 7a;

DETAILED DESCRIPTION OF PREFERRED EMBODIMENTS

Figure 1:
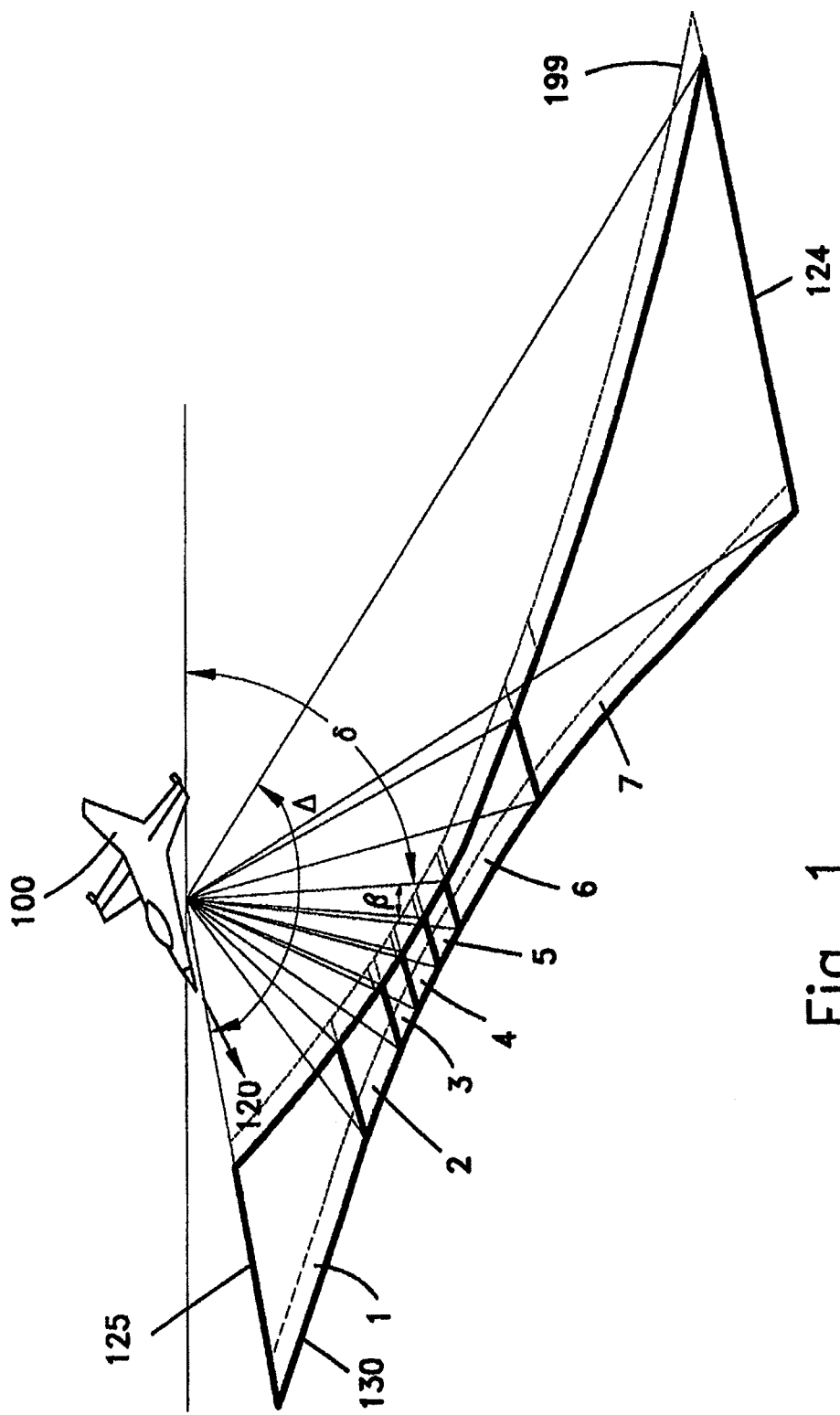
FIG. 1 shows a typical airborne reconnaissance system of the prior art.

A typical airborne reconnaissance system of the prior art is shown in FIG. 1. Aircraft 100, provided with an imaging system (not shown) flies in a direction as marked by arrow 120. The imaging system generally comprises a camera for capturing images of terrain 130. Such a camera briefly comprises optics, some type of sensing means such as a focal plane array, and images storage, generally digital storage for storing the captured images. The optics of the system and the sensing means (generally in a form of a focal plane array) are typically mounted on gimbals mechanism which changes the line of sight (i.e., the view direction) of the camera during the flight perpendicular to the direction of flight (i.e., across track). While changing the view direction (angle δ), the camera captures a plurality of images, such as images 1-7, forming a strip of distinct images, that may somewhat overlap (hereinafter, a "strip" of images which is resulted from such perpendicular change of direction will also be referred to as a "row" strip, or "transversal" strip). By using such gimbals mechanism, the camera can scan a larger field of regard in comparison with a static camera, while the resolution of the images is essentially maintained in all the directions.

For example, in a system such as the one shown in FIG. 1, the field of view angle 13 of the camera may be in the order of about 5°-10°. An increase of the field of view will result in reduction of the image resolution. In order to scan a transversal wide strip of images such as the one including images 1-7 of FIG. 1, the gimbals mechanism sequentially changes the angle δ in a stepwise manner, while, in each step, one image from the strip including images 1-7 is captured. Then, the procedure is similarly repeated for a next sequence of images in a similar manner. In FIG. 1, the strip area shown by dotted line 199 indicates a previous scanning sequence of an area strip, and those shown by bold lines indicate a present scanning sequence (it should be noted that generally there is an overlap between neighboring frames in both the along track and the across track direction in order to enable post-"mosaicing" of the captured frames, or for stereoscopic display. A next scanning sequence is not shown, but it is similar to said two sequences.

Figure 2:
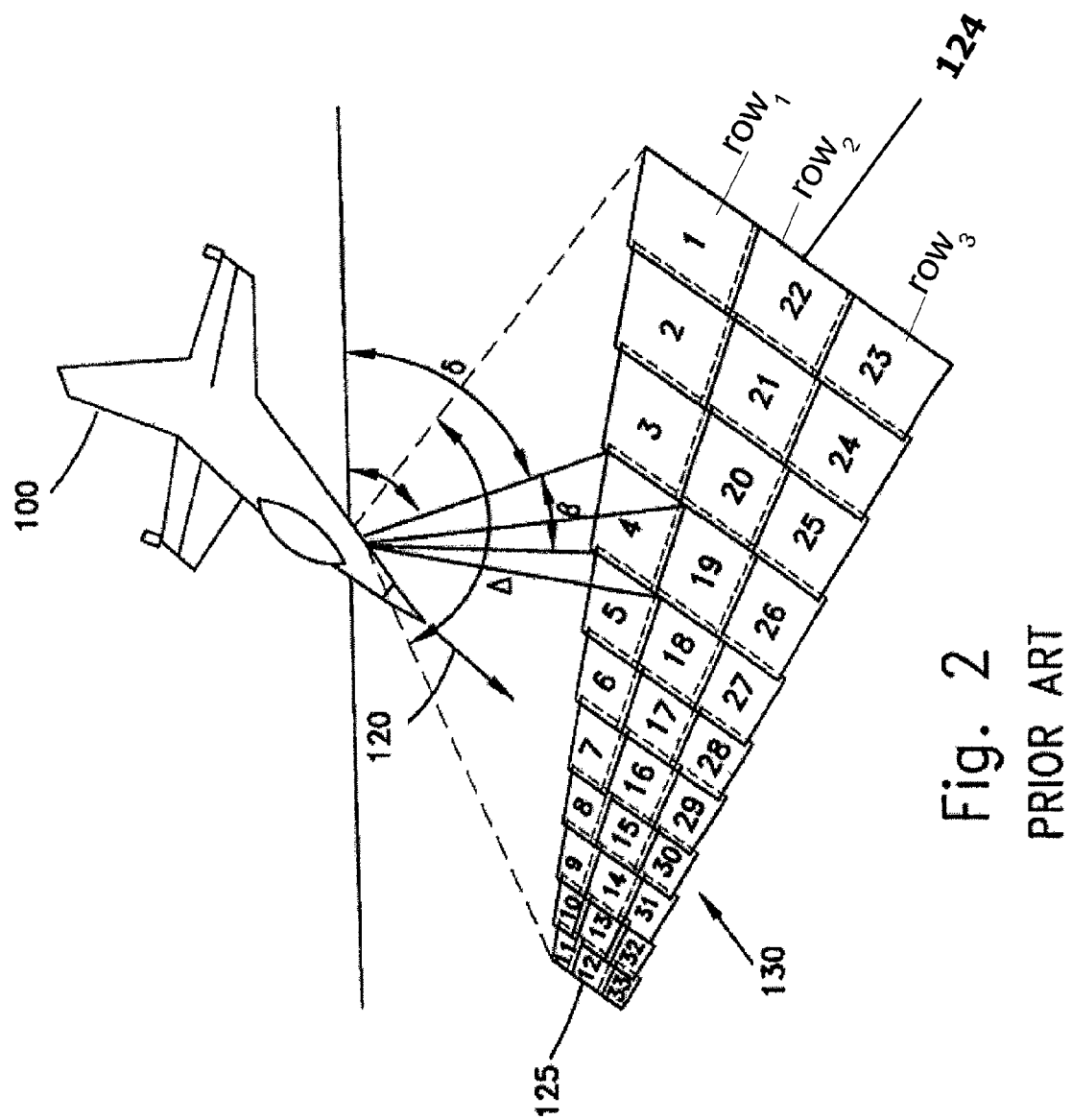
FIG. 2 illustrates the manner by which the prior art system of FIG. 1 scans an area of interest.

FIG. 2 shows how the prior art system of FIG. 1 scans an area of interest. The system scans the area row by row, while it sequentially captures images from the terrain from image 1 at the leftmost to image 11 at the rightmost, and in the next row from the rightmost (frame 12) to the leftmost (frame 22), and then again in the next row from image 23 at the leftmost to image 33 at the rightmost, etc. As can be seen, the field of view captured by each frame is defined by angle β. It should be noted that for the sake of simplicity the captured frames are shown herein as being squares, such that the angle for the length and width are both having same angle β. However, the captured frames may have a form of rectangle, and in that case the angles for the width and length would be different angles.

The use of a back scanning mirror in a manner known in the art generally somewhat increases the size of the area which can be scanned by an airborne reconnaissance system in a given time. More specifically, instead of mechanically "nailing" the line of sight from the focal plane array on the photographed area portion during the integration period, when a back-scanning mirror is used, the gimbals performs a continuous progression from the left end to the right end and vice versa, while during each integration period, a back-scanning mirror is activated in such a manner that it diverts the line of sight in a direction opposite to the progression direction of the gimbals (i.e., in a transversal direction) in order to maintain the "nailing" of the line of sight on a same point of the area photographed during the integration period to avoid smearing. The back scanning mirror increases the size of the area which can be scanned in a given time, as the speed of the gimbals is maintained essentially constant during a significant portion of the scanning cycle (the "scanning cycle is defined as the time it takes the gimbals to divert the line of sight from the leftmost end 124 of the terrain to the rightmost end 125), besides accelerations and decelerations at the two ends. However, said gimbals accelerations and decelerations proximate to said two ends still respectively reduce the size of the area which can be scanned in a given time proximate to said ends. An object of the present invention is to increase the size of the area which can be scanned in a given time proximate to the two ends, which is typically reduced at prior art systems.

Figure 3:
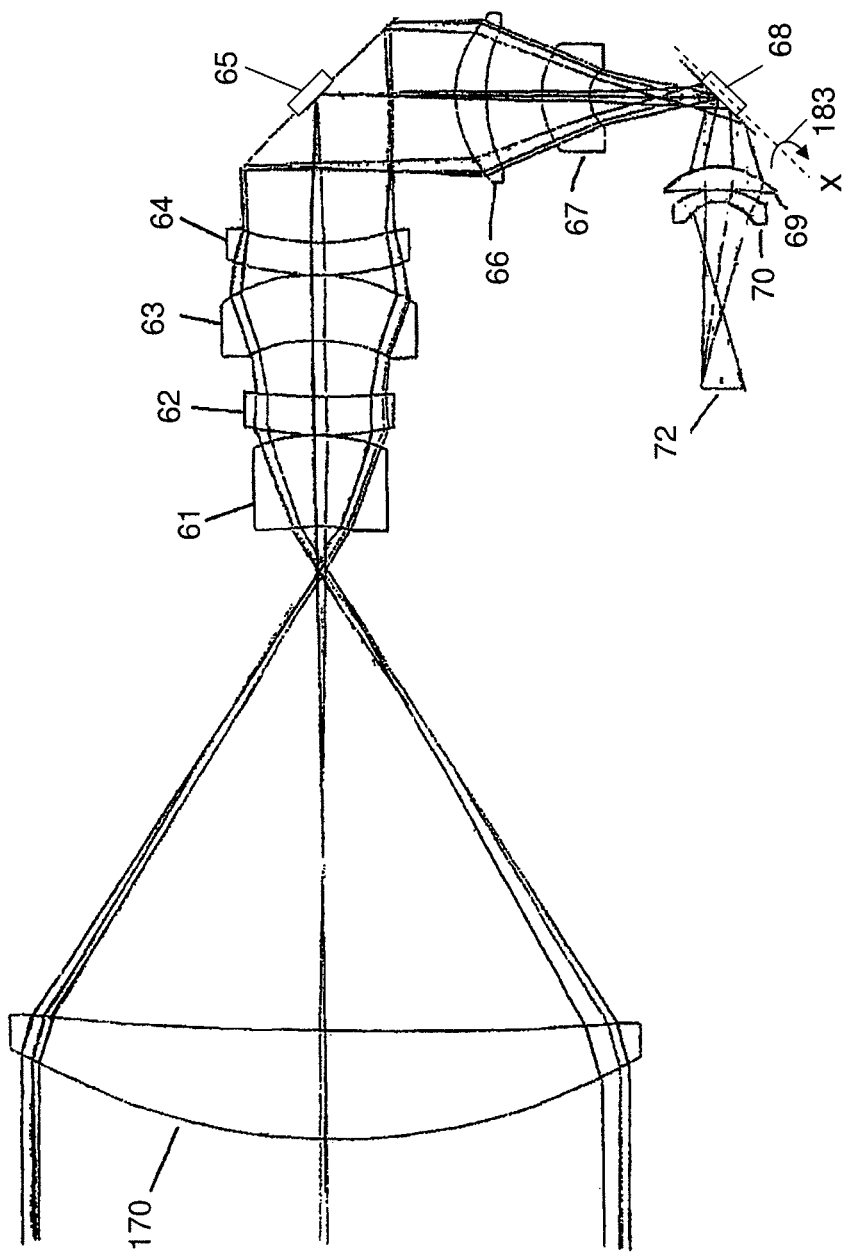
FIG. 3 shows the structure of a typical imaging system of the prior art.

FIG. 3 shows a typical imaging system according to the prior art. The system is positioned on gimbals (not shown), which changes the line of sight direction to the terrain, and enables obtaining a plurality of images within a transversal strip in a manner as described in FIG. 1. The progression of the gimbals from the leftmost end to the rightmost end is continuous, while a back-scanning mirror is activated during each integration period to compensate for the right-left continuous progression of the gimbals. In one instant of the gimbals, the front lens 170 of the system is directed toward a terrain image portion (such as image 4 of FIG. 2) and collects light rays there from. The light rays pass an optical path, which comprises a series of optical elements indicated in FIG. 3 as elements 61-70. Such elements are generally lenses such as lenses 61, 62, 63, 64, 66, 67, 69, and 70, and two or more folding mirrors 65 and 68, one of them is a back-scanning mirror. In the example of FIG. 3, the back scanning mirror is mirror 68 which rotates during the integration period about axis x as shown by arrows 183. (however, the locations of said two mirrors 65 and 68 may be interchanged, such that the back scanning mirror 68 be located at the present location of mirror 65), and vice versa. Other conventional optical elements may also be included. At the final stage, the system produces a final image of the terrain portion (for example, portion 4 of FIG. 1) on a focal plane array 72. The size of said final image is dictated by the optics, and it is so designed in the prior art to be essentially of the size of the focal plane array 72, as otherwise some of the terrain data will be lost (for not being captured by the focal plane array). It should be noted that in the prior art system the folding mirror 65 is fixed (i.e., stationary), while the back-scanning mirror 68 operates during the integration period as described above to compensate for the continuous movement (as said, not in proximity to the two ends where there is an acceleration or deceleration) of the line of site (and gimbal).

Figure 4:
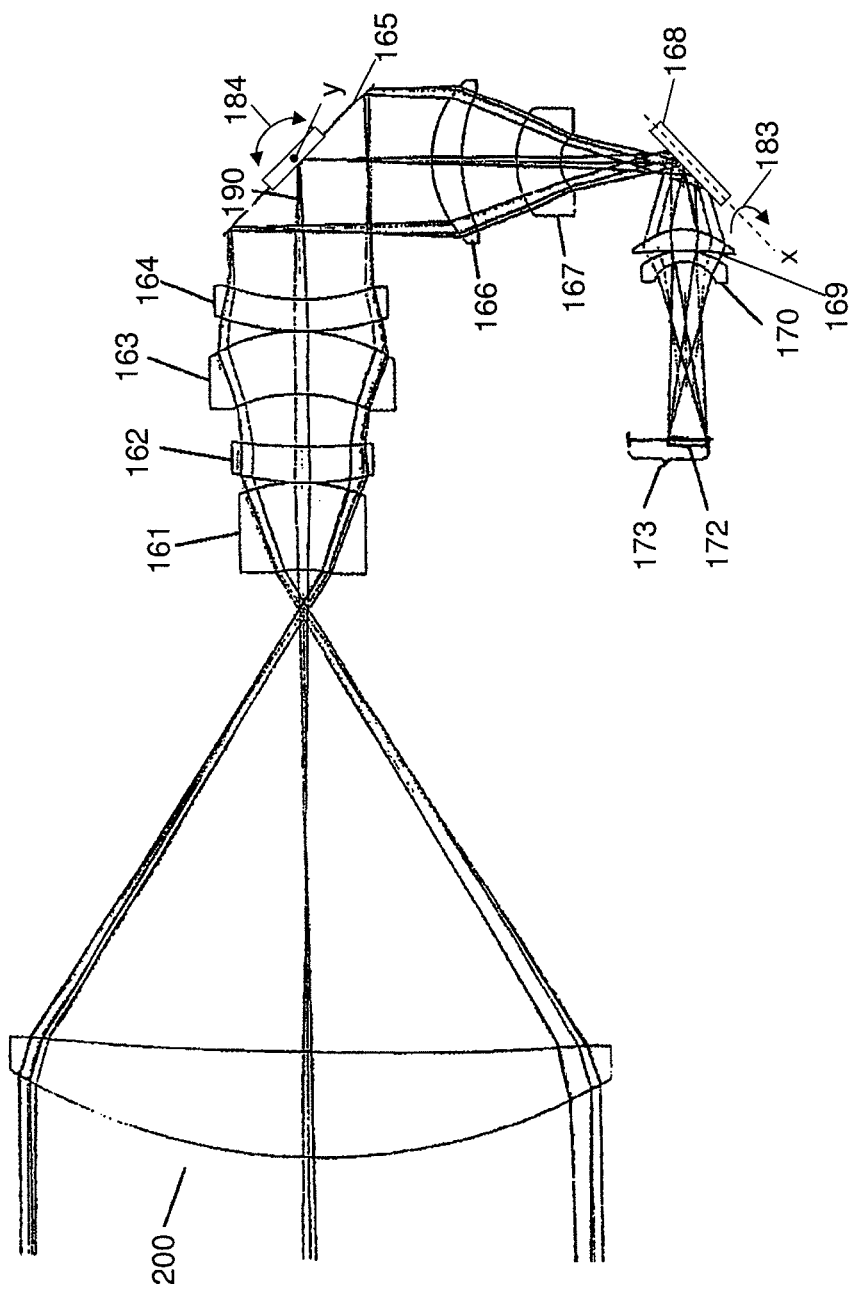
FIG. 4 shows the structure of an imaging system according to one embodiment of the invention.
Figure 5:
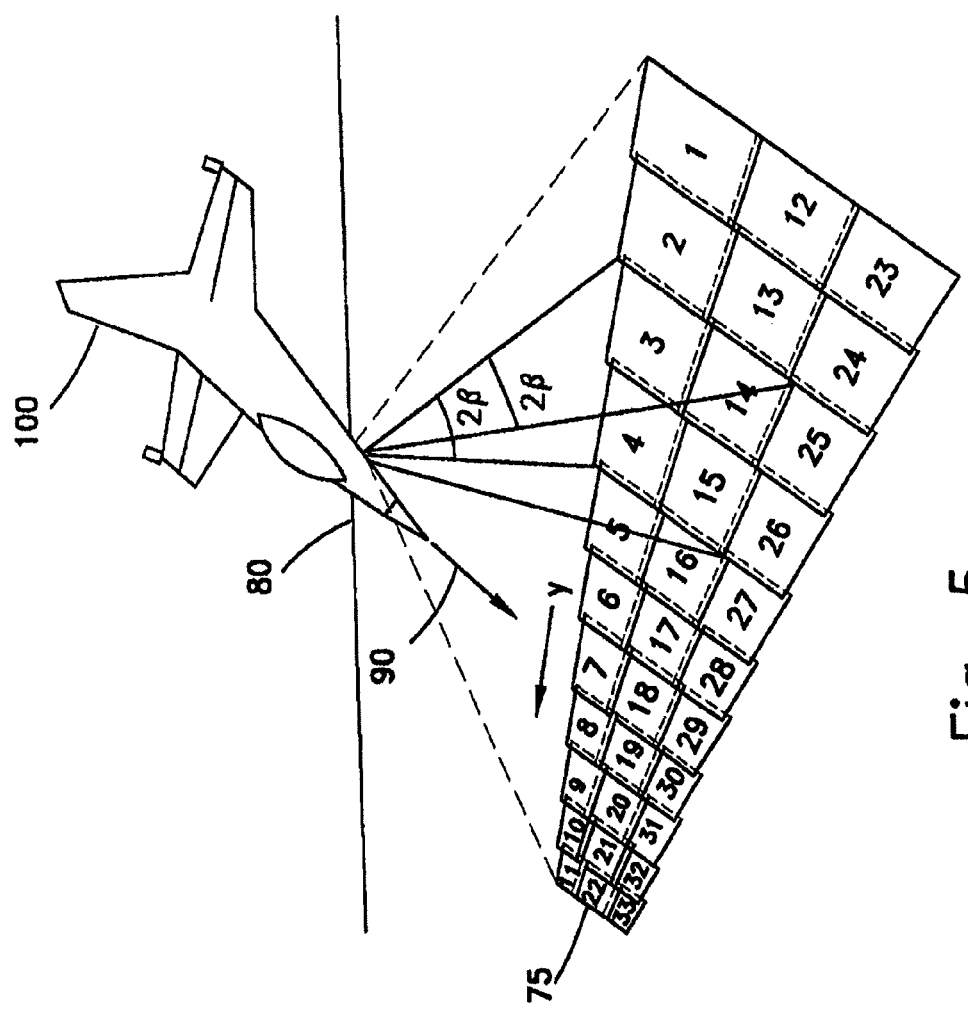
FIG. 5 illustrates the manner by which the system of the present invention scans an area of interest.

An optical system according to the present invention is shown in FIG. 4. The system of FIG. 4 is similar to the prior art system FIG. 3. However, the system of the present invention, as shown in the embodiment of FIG. 4 acquires a terrain portion which is several times (for example 4 times) larger in size than the terrain portion as acquired by the system of FIG. 3. In other words, the field of view angle β in the system of the present invention is larger. In one embodiment said angle β is twice in size in comparison with the corresponding angle in the prior art system of FIG. 3. Therefore, with double size of angle β, the terrain portion that is acquired by the optical system is in fact four times larger than in the system of FIG. 3. For example, and as shown in FIG. 5 showing one specific instant, for a field of view angle of 2β, four area portions 3, 4, 14, and 15 are acquired, and they produce a final image at the focal plane which has an area S and is four times larger than the size A of the focal plane array. The final image (also referred to herein as the "acquired image") according to the present invention is indicated in FIG. 4 by numeral 173, and it can be seen that the image has in this specific example twice the length of the focal plane array 172. In fact, the image includes portions from two adjacent rows (across track strips), in contrast to the prior art case where the image is taken from a single row. The width of the image 173 is also twice the width of the focal plane array. Therefore, for double size angle β, the image 173 which is produced at the focal plane has a total area S which is four times larger than the area A of the focal plane array 172, and four times larger than the image 72 produced in the system of FIG. 3. Of course, only ¼ of the image 173 is impinged on the focal plane array at any given time.

According to the present invention (see FIG. 4), however, the portion of the image 173 that is impinged on the focal plane array is switched. This is done by changing the orientation of one folding mirror, preferably mirror 165 between several states. If the size of the image produced at the focal plane is 4 times the size of the focal plane array, while imaging, for example, from $row_1$ and $row_2$, the mirror 165 alternately switches to impinge each time a portion of the whole image acquired first from $row_1$, next from $row_2$, than again from $row_1$, next from $row_2$, etc. (see FIG. 6*b*) If, for example, the size is 9 times the size of the focal plane array (3×3) while imaging, for example, from $row_1$ $row_2$, and $row_3$, the mirror alternately switches to impinge each time a portion of the whole image acquired first from $row_1$, next from $row_2$, than from $row_3$, again from $row_1$, next from $row_2$, next from $row_3$, etc. Said mirror has a small rotation about one axis, axis y, as indicated by arrows 184. For example, for double size β, the rotation of mirror 165 about axis y may switch the mirror back and forth between 2 states as shown by arrows 184. The rotation is generally very small. The states of the mirror are so designed that at each state the light rays are so diverted that another portion of image 173 is fully impinged on the focal plane array 172. During each integration period, back scanning mirror 168 is activated during each integration period to cause movement of the line of sight on the focal plane array in a direction opposite to the direction of the essentially continuous movement of the gimbals. Again, as in the embodiment of FIG. 3, mirror 168 rotates about one axis x, as indicated by arrow 183.

It should be noted that although the terms "mirrors" or "folding mirrors" are used throughout this application, other equivalent devices that are capable of diverting light rays may be used instead. Furthermore, the "along track mirror" may be used also for the purpose of forward motion compensation (in case that other means for that purpose are not used). It should also be noted herein that the locations of the back scanning mirror 168 and the along track mirror 165 may be interchanged. It should also be noted that the terms "first" and "second", when associated with said two mirrors throughout this application, are provided for indexing purpose only, and they do not intend to indicate the mirrors appearance order along the optical path.

Figure 6A:
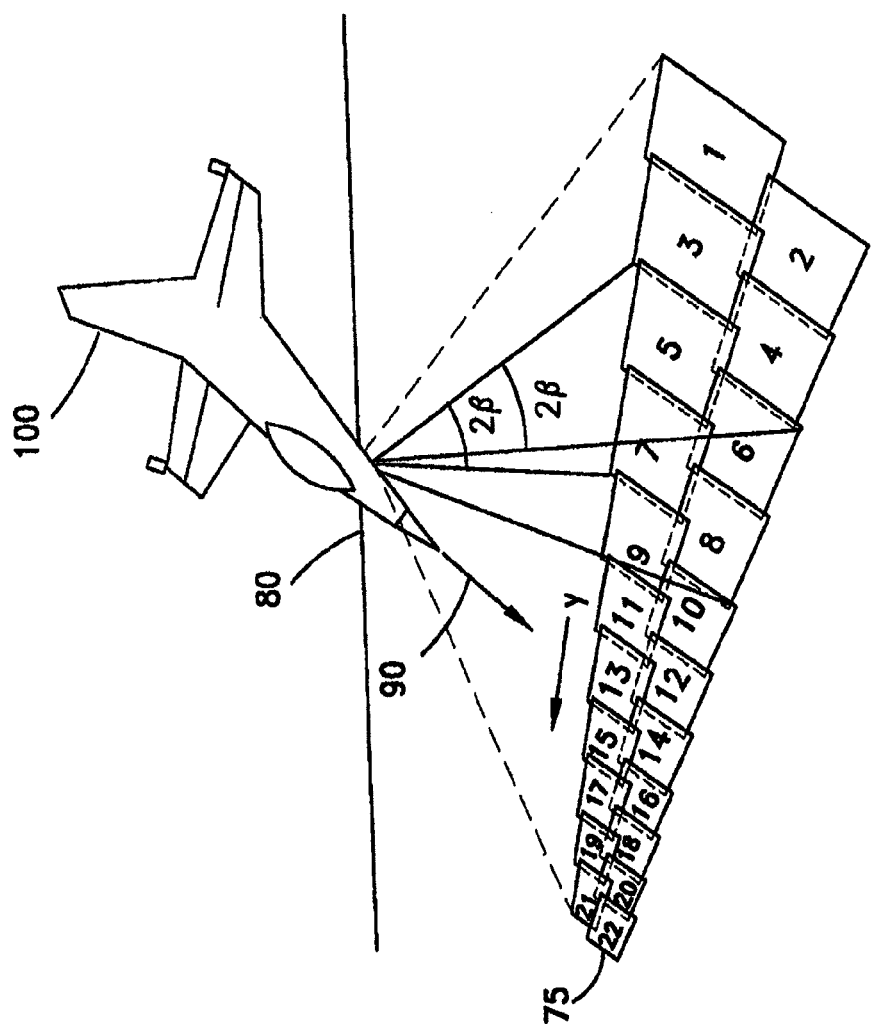
FIG. 6a shows an example for the sequence of frames capturing as performed when the field of view angle β is doubled to include terrain portions from two rows at the focal plane.

FIG. 6a shows an example for the sequence of frames capturing as performed when the field of view angle β is increased to include terrain portions from two rows at the focal plane 173.

It has been found by the inventors that the alternating of the frames capturing between two or more rows (i.e., alternating between rows in the along-track direction) can increase the size of the area of interest which can be scanned by an airborne reconnaissance system in a given time, in comparison to the prior art cases (such as of FIGS. 2 and 3) where the sequence of frames is taken one after the other from only one row, and the switching to a next row is performed only after the entire completion of the frames capturing from a present row. This increase of the size of the area which can be scanned in a given time results from the fact that the structure of the present invention as described is more efficient in terms of the frame area coverage proximate to the two end locations (to the right and left of the aircraft) where the gimbals accelerates or decelerates.

The following explanation provides a mathematical proof showing why the manner of scanning as performed by the present invention is more efficient in terms of the size of the area which can be scanned in a given time. More specifically, the explanation proves that in an across track reconnaissance system having a back scanning mirror, when the sequence of frames capturing is performed alternately from two sequential rows (i.e. alternation in the along-track direction), the area capturing rate (i.e., the rate of the coverage of the area of interest per unit of time) is increased in comparison to the case where the sequence of frames capturing is performed twice, each time from a single row. In a similar manner, a proof can be provided to show how the area capturing rate is increased where the alternation is made from three, or even more rows.

Figure 6B:
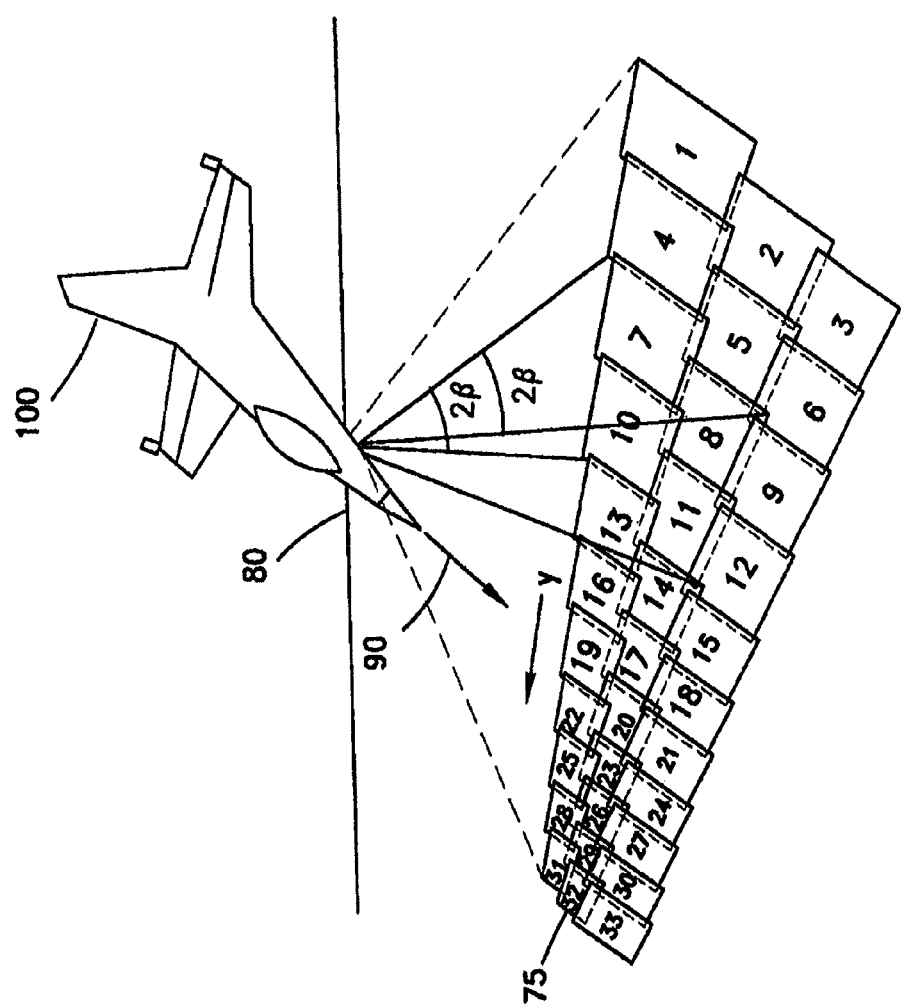
FIG. 6b shows an example for the sequence of frames capturing as performed when the field of view angle β is tripled to include terrain portions from three rows at the focal plane.

FIG. 6b shows an example for the sequence of frames capturing as performed when the field of view angle β is increased to include terrain portions from three rows at the focal plane 173.

Figure 7A:
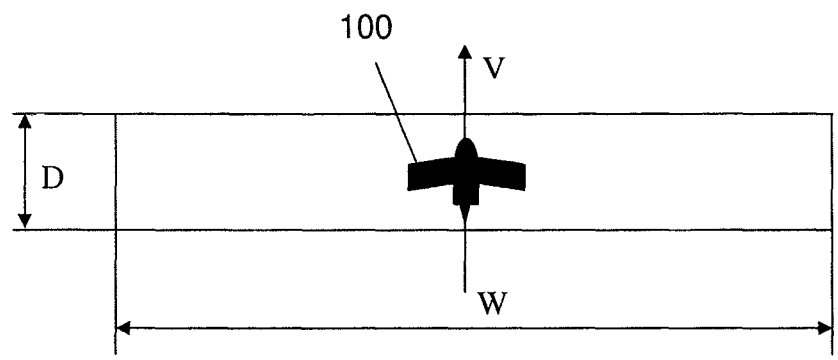
FIG. 7a shows a top view of an aircraft 100 which performs an across track reconnaissance mission.

FIG. 7a shows a top view of an aircraft 100 which performs an across track reconnaissance mission. $D_{[m]}$ indicates the width in the direction of flight of a scanned row, and $W_{[m]}$ indicates the length from the right to the left of the aircraft of the scanned row. The aircraft flies at a velocity of $V_{[m/s]}$ in the direction as shown.

Figure 7B:
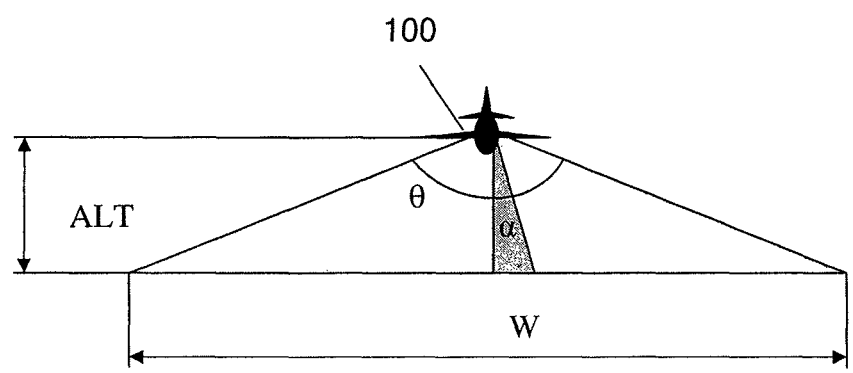

FIG. 7b shows the front view of the scanning process of FIG. 7a. Aircraft 100 flies at an altitude $ALT_{[m]}$. Angle θ indicates the field of regard (scanning angle) full angle from the left to the right of the aircraft, and angle α indicates the angle that is assigned for each captured frame.

Figure 7C:
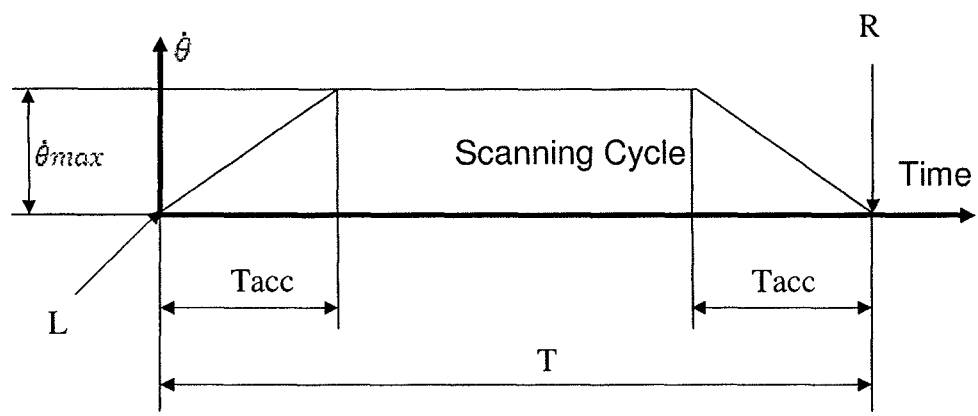
FIG. 7c illustrates the change of gimbals velocity $\dot{\theta}$ while scanning from the left to right of the aircraft.

FIG. 7c illustrates the change of gimbals velocity $\dot{\theta}$ while scanning from the left to right of the aircraft. As shown, at the two ends R and L, the velocity of the gimbals is zero. From the ends R or L, the gimbals begin acceleration (assuming constant acceleration) during the time of $T_{acc}$ until it reaches the maximal velocity of $\dot{\theta}_{[max]}$. Similarly, when the gimbals approaches one of the two ends, the gimbals performs deceleration during the time of $T_{acc}$. Therefore, the full scanning cycle from the left to the right of the aircraft takes a time of T.

Several parameters limit the maximal size of the area which can be covered by an airborne reconnaissance system in a given time (i.e., during one cycle), as follows:

a. $Rate_{[Hz]}$: The framing rate is the number of frames that can at all be taken in one second. This rate is generally limited, for example, by the physical characteristics of the sensors of the focal plane array, and by the integration period.

b. D and V—the width of the row D and the aircraft velocity V also limit the number of frames that can be captured, as the they impose a cycle time T of D/V during which the scanning cycle has to be completed, as after that time the terrain "row" is no longer below the aircraft.

c. The total scanning angle θ—Of course, the larger angle θ is, more frames have to be captured during a given time to cover the terrain "row" below the aircraft.

The following parameters are also defined:
D—Row Width;
W—Row Length (Swath);
V—A/C Speed;
ALT—Aircraft Altitude;
θ—Scanning Angle;
α—Single Frame Angle;
T—Total Row Scanning Time (Scanning Cycle);
$T_{acc}$—Acceleration/Deceleration Time;
$\dot{\theta}$—Scanning Angular Velocity;
$\dot{\theta}_{max}$—Max Angular Velocity;
$\ddot{\theta}_{max}$—Max Angular Acceleration;
Rate—Framing Rate (Hz) (i.e., number of captured frames per second);

For typical prior art scanning with a back scan mirror:

1. $T = \dfrac{D}{V}$

2. $T_{acc} = \dfrac{\dot{\theta}_{max}}{\ddot{\theta}_{max}}$

3. $\dot{\theta}_{max} = \alpha \cdot \text{Rate}$

4. $\theta = 2\dfrac{T_{acc} \cdot \dot{\theta}_{max}}{2} + (T - 2T_{acc}) \cdot \dot{\theta}_{max}$ (from FIG. 7c)

5. $\theta = \dot{\theta}_{max}(T - T_{acc})$ based on (4)

6. $\theta = \dot{\theta}_{max}\left(\dfrac{D}{V} - \dfrac{\dot{\theta}_{max}}{\ddot{\theta}_{max}}\right)$ based on Eq's. 1, 2, 5

7. $\theta = \dfrac{(D \cdot \dot{\theta}_{max})}{V} - \dfrac{\dot{\theta}_{max}^2}{\ddot{\theta}_{max}}$ based on (6)

8. $\theta = \dfrac{(D \cdot \alpha \cdot \text{Rate})}{V} - \dfrac{\text{Rate}^2 \alpha^2}{\ddot{\theta}_{max}}$ based on 3, 7

Now, for a scanning according to the present invention, which includes a back-scanning mirror, with alternate switching between rows:

$\theta \to \theta_1$

9. $\text{Rate}_1 = \dfrac{\text{Rate}}{2}$ $D_1 = 2D$ wherein, the $index_1$ indicates a parameter according to the present invention.

10. $\theta_1 = \dfrac{(2D \cdot \alpha \cdot \text{Rate})}{2V} - \dfrac{\text{Rate}^2 \cdot \alpha^2}{4 \cdot \ddot{\theta}_{max}}$ [Based on 8, 9]

-continued

11. $\theta_1 = \frac{(D \cdot \alpha \cdot \text{Rate})}{V} - \frac{\text{Rate}^2 \cdot \alpha^2}{4 \cdot \dot{\theta}_{max}}$ [Conclusion: $\theta_1 > \theta$]

More specifically, it has been proven that in a back-scanning system which uses a simultaneous two-row scanning where a mirror alternately captures frames from the two rows, the overall size of the area scanned by in a given time is increased, or in other words, a larger total angle θ can be obtained, while the other parameters remain the same. Therefore, it has been proven that the structure of the system of the invention which alternates between two rows (i.e., in the along track direction) increases the size of the area scanned in a given time in compare to a prior art system which sequentially captures frames from a single row, while reverting to a next single row only after completion of the scanning of said previous single row. Furthermore, it can be easily shown that the system of the invention is advantageous also when the frames are alternately captured from more than two rows, e.g., three or more rows, in compare to the conventional case which sequentially captures frames from a single row, while reverting to a next single row only after completion of the scanning of said previous single TOW.

Furthermore, in some embodiments of the present invention when the "across track" axis is not exactly perpendicular to the aircraft flying direction, each of said two single axis mirrors performs some back scanning and some along track motion simultaneously.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. An airborne reconnaissance system for use in an aircraft, comprising:
   a. an optical unit for acquiring light rays from a portion of a terrain below the aircraft, said optical unit comprising a plurality of optical components positioned along an optical path and arranged to maneuver said light rays to produce at a focal plane an acquired image of the terrain portion, said acquired image at the focal plane having an area S several times larger than an area A of a focal plane array positioned at said focal plane;
   b. a gimbals unit for performing a continuous back and forth across-track scanning movement of a respective line of sight formed between said optical unit and the terrain below the aircraft;
   c. a first, back-scanning mirror along said optical path, for compensating for said continuous across track movement of the line of sight, said compensation being performed such that during each entire course of back or forth across track movement, a plurality of images of areas S fall and stabilize, each in its turn, on the focal plane;
   d. a second, along-track mirror also positioned along said optical path, which alternates, each time that an image of area S falls and stabilizes at the focal plane, between a plurality of distinct along track states, each state causing a different diversion of the light rays within said optical path thereby to impinge on said focal plane array another along-track section of said acquired image of area S; and
   e. capturing means for recording in each state of said along-track mirror the corresponding section of the terrain portion image impinged during said state on the focal plane array.

2. The system according to claim 1, wherein each of said first and second mirrors causes a change of diversion of the light rays due to a rotation about one respective axis of said mirror, wherein each mirror rotation is independent from the rotation of the other mirror.

3. The system according to claim 1, wherein the optical components of the optical unit comprise a plurality of lenses and at least the first and second mirrors.

4. A method for airborne reconnaissance of a terrain below an aircraft, comprising:
   a. acquiring, with an optical unit, light rays from a portion of the terrain below the aircraft, said optical unit comprising a plurality of optical components positioned along an optical path and arranged to maneuver said light rays to produce at a focal plane an acquired image of the terrain portion, said acquired image at the focal plane having an area S several times larger than an area A of a focal plane array positioned at said focal plane;
   b. performing, with a gimbals unit, a continuous across-track back and forth scanning movement of a line of sight formed between said optical unit and the terrain below the aircraft;
   c. compensating, with a first back-scanning mirror along said optical path, for said continuous across track movement of the line of sight, said compensation being performed such that during each of said back and forth entire movements, a plurality of images of areas S fall and stabilize, each in its turn, on the focal plane;
   d. causing a second, along-track mirror positioned along said optical path, to alternate, each time that an image of area S falls and stabilizes at the focal plane, between a plurality of distinct along track states, each state causing a different diversion of the light rays within said optical path to impinge on said focal plane array another along-track section of said acquired image of area S; and
   e. capturing and recording in each state of said along-track mirror the corresponding section of the terrain image which is impinged during said state on the focal plane array.

5. The method according to claim 4, wherein each of said first and second mirrors causes a change of diversion of the light rays due a rotation about one respective axis of said mirror, and wherein each mirror rotation is independent from the rotation of the other mirror.

6. The method according to claim 4, wherein the optical components of the optical unit comprise a plurality of lenses and at least said first and second mirrors, each of said mirrors being a single axis motorized mirror.

* * * * *